United States Patent [19]

Gusching et al.

[11] Patent Number: 4,736,512
[45] Date of Patent: Apr. 12, 1988

[54] TOOL AND WORK CHANGER ASSEMBLY

[75] Inventors: Nagle V. Gusching, Sidney; Richard R. Daulton, Cincinnati, both of Ohio

[73] Assignee: The Monarch Machine Tool Company, Sidney, Ohio

[21] Appl. No.: 902,159

[22] Filed: Aug. 29, 1986

[51] Int. Cl.$^4$ ............................................. B23Q 3/155
[52] U.S. Cl. .......................................... 29/568; 82/2.7
[58] Field of Search .............................. 29/568; 82/2.7

[56] References Cited

U.S. PATENT DOCUMENTS

| | | | |
|---|---|---|---|
| 3,647,090 | 3/1972 | Suzuki et al. | 29/568 X |
| 3,667,114 | 6/1972 | Smith et al. | 29/568 |
| 4,577,389 | 3/1986 | Shultz | 29/568 |
| 4,599,786 | 7/1986 | Uhtenwoldt | 29/568 |
| 4,601,094 | 7/1986 | Myers | 29/568 |
| 4,608,747 | 9/1986 | Link et al. | 29/568 |

Primary Examiner—Z. R. Bilinsky
Attorney, Agent, or Firm—Pearne, Gordon, McCoy & Granger

[57] ABSTRACT

A combined tool and work changer assembly is disclosed for a machine tool wherein a carrier moves in a first path on an elongated beam parallel to the length of the machine tool. Both the tool changer and workpiece are mounted on the carrier and the tool changer is movable in the space defined by X, Y, and Z mutually perpendicular axes, with the first path being parallel to the Z-axis. This first path has a length sufficient to move the tool changer between a tool storage magazine and the machine tool, and the work changer is mounted on the second portion of the carrier to be movable in this first path between a workpiece storage area and the machine tool. Numerical control is used to control movement of the tool changer and movement of the workpiece changer with common control of both changers along the first path by movement of the carrier. This simplifies the construction of the combined changers. The foregoing abstract is merely a resume of one general application, is not a complete discussion of all principles of operation or applications, and is not to be construed as a limitation on the scope of the claimed subject matter.

10 Claims, 5 Drawing Sheets

FIG. I

TOOL AND WORK CHANGER ASSEMBLY

BACKGROUND OF THE INVENTION

Many machine tools have utilized tool changers and other machine tools have utilized workpiece changers which are a form of robotic control. There has also been known a single machine tool which utilizes both a workpiece changer and a tool changer. One such machine tool utilizes a workpiece changer separate from the tool changer, wherein both move individually on a track or slide, for example, parallel to an axis of a machine tool. In such a mechanism, each of the workpiece changer and tool changer is separately controlled by a programmable control, with all the complexity and expense entailed thereby, and the only common part of the mechanism between these two changers is the slide or trackway on which they both travel. In this prior art, each of the workpiece and tool changers adds several axes of motion, for example, along X, Y, and Z axes, and at least two axes of motion on each changer was a precise positioning control, which may be a servocontrol with a feedback from a resolver to assure that the changer had been precisely positioned. Such controls are quite expensive. This has the disadvantage that the two could possibly crash into each other, and also has the complexity of the proper programmable control of the motions of each.

SUMMARY OF THE INVENTION

The problem to be solved, therefore, is how to construct a tool and work changer assembly for a machine tool wherein these two changers cannot crash into each other, and wherein the numerical control for one of the changers is simplified to make it less expensive and easier to program and use.

This problem is solved by a tool and work changer assembly for a machine tool, comprising in combination a member fixed relative to said machine tool, a carrier movable on said member in first and second directions in a first path, a tool changer mounted on a first portion of said carrier and movable in space defined by X, Y, and Z mutually perpendicular axes, said first path of said carrier being parallel to one of said axes and having a length sufficient to move said tool changer between a tool storage magazine and said machine tool, a workpiece changer mounted on a second portion of said carrier and movable with said carrier in said first path between a workpiece storage area and said machine tool, and numerical control means to control movement of said tool changer and to control movement of said workpiece changer with common control of both changers along said first path by movement of said carrier along said member.

Accordingly, an object of the invention is to provide a combined tool or work changer assembly, with the two changers mounted on a common carrier so that they cannot crash into each other.

Another object of the invention is to provide a tool and work changer assembly wherein a numerical control controls the carrier on which each of the two changers is mounted, this common control of both changers being along a common path.

Another object of the invention is to provide a combined tool and work changer assembly, with both changers mounted on a common carrier, and at least two axes of the control on the work changer being precise positioning or closed-loop control, and with all axes of motion on the tool changer being fixed length travel control except the closed-loop control of the common carrier.

Other objects and a fuller understanding of the invention may be had by referring to the following description and claims, taken in conjunction with the accompanying drawing.

DETAILED DESCRIPTION OF THE PREFERRED EMBODIMENT

Figure 1:
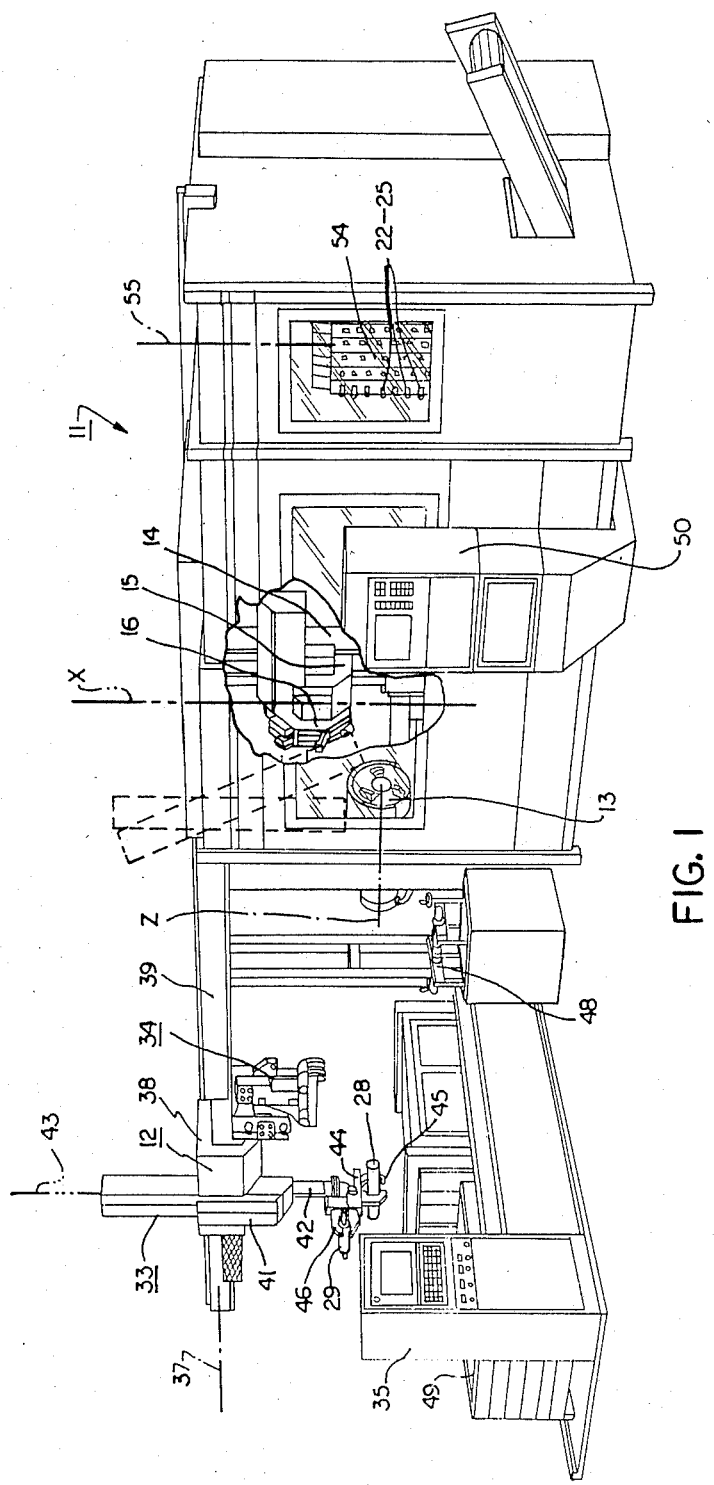
FIG. 1 is a perspective view of a machine tool embodying the invention.

FIG. 1 illustrates a machine tool 11 with which the combined tool and work changer assembly 12 may be used. The machine tool 11 is shown as a lathe having a rotatable work spindle 13 rotatable about a Z-axis. The machine tool 11 also has a carriage 14, movable horizontally parallel to the Z-axis, and a slide 15, movable vertically along an X-axis. A tool carrying turret 16 is indexable on the slide 15. The turret 16 is better shown in FIG. 5, and is adapted to carry a plurality of tools. More specifically, the turret 16 has a face 17 and a periphery 18, each of which is adapted to carry a plurality of tool holders 19. All of the tool holders have identical external shape for mounting on the turret 16, and are adapted to be inserted in and locked into keyways 20 on the face 17 and keyways 21 on the periphery 18 of this turret. As an example, this turret 16 includes four such keyways on the face and four keyways alternating in position on the periphery of this octagon-shaped turret. The identical tool holders 19 are adapted to carry tools of different kinds, an example being the boring tools 22 or inside diameter turning tools 23 on the face 17, and outside diameter turning tools 24 and facing tools 25 on the periphery 18. The identical external shaped tool holders 19 permit great flexibility in the mounting of various tools on the turret to perform all manner of cuts on a rough workpiece blank 28 positionable in the spindle 13 to turn it into a finished workpiece 29.

The tool and work changer assembly 11 includes a workpiece changer 33 and a tool changer 34. The workpiece changer 33 has five different paths of movement, or what is commonly called "five axes of control" by a numerical control 35, which, for example, might be an Allen-Bradley 8200R unit. The first axis of movement 37 is a movement of the entire workpiece changer 33 on a carrier 38 along a beam or member 39 fixed relative to the machine tool 11. This first axis 37 is parallel to the Z-axis of the machine tool in this preferred embodiment. A housing 41 is mounted on the carrier 38 for arcuately swinging movements about the first axis 37, or about an axis parallel to it. A column 42 is mounted in the housing 41 for up and down movements along a second axis 43. The column 42 may also be rotated about the second axis 43, e.g., through 180 degrees, to turn the workpiece blank 28 end-for-end. On the lower end of the column 42, a hand 44 is arcuately pivotable through 90 degrees, for example, so that rough workpiece grippers 45 for the rough workpiece blank 28 may be directed downwardly or so that finished workpiece grippers 46 for the finished workpieces 29 may be directed downwardly. This gives five axes of movement to the workpiece changer 33, namely: the travel of the carrier 38 along the axis 37; swinging movement of the axis 43 about the axis 37; movement of column 42 along axis 43; 180-degree rotation of column 42 about axis 43; and 90-degree arcuate movement of the gripper hand 44. At least the first three of these five axes of movement are precisely controllable in velocity and positioned by a control such as a closed-loop control system. This may be of a servomotor with resolver feedback, for example, so that in each axis of movement, the workpiece grippers 45 or 46 may be precisely repeatably positioned, and the closed loop assures that there is precision repeatability of such positioning within±0.002 inch along each axis, and also that there may be controlled, smooth accelertion and deceleration of such motions in at least three of the five axes. The workpiece changer 33 may be controlled by the numerical control 35 to remove one of a plurality of rough workpiece blanks 28 from a pallet 49, raise it and move it parallel to the first axis 37, and then swing about the first axis 37 and lower, and then retract parallel to the first axis 37 in order to place this rough workpiece blank 28 in the rotatable work spindle 13. The workpiece changer 33 may then withdraw so that the various tools 22 to 25 in the turret 16 may perform cutting operations on this workpiece blank to turn it into the finished workpiece 29. When the machining is completed, the workpiece changer 33 will again be used, and in its advancing movement will preferably carry with it another rough workpiece blank 28, so that after the finished workpiece is removed by the finished workpiece grippers 46, the rough workpiece grippers 45 will insert the next rough workpiece blank 28 into the spindle 13 for machining thereon. This machining may be under control of a numerical control 50, such as a G.E. 2000T. The workpiece changer 33 may also have sufficient range of movement along the five axes so as to be able to place the finished workpiece 29 in a postprocess gaging fixture 48.

The machine tool 11 is provided with a tool storage magazine 54 to provide reserve storage of many tools, including the tools 22–25, each mounted in one of the identical externally shaped tool holders 19. In this embodiment, the tool storage magazine 54 is indexable about an axis 55, which in this embodiment is vertical, so that a greater number of tools may be carried and may be available to the tool changers 34. In this preferred embodiment, the various tool holders are available for interchange with the tool changer 34 at a tool selector station at the top of each of the various columns on the drum 54.

Figure 2:
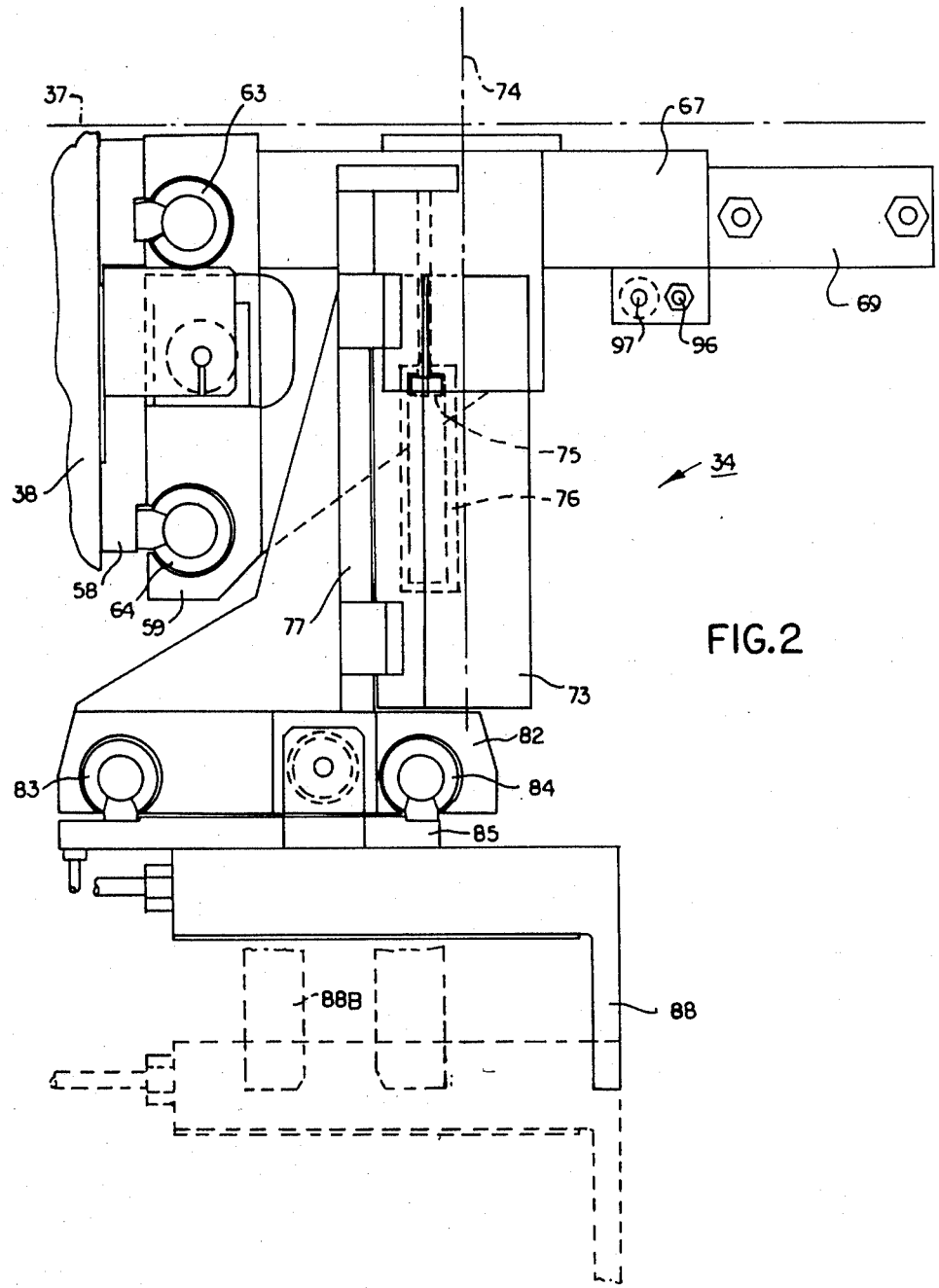
FIG. 2 is a front elevational view of the tool changer of the invention.
Figure 3:
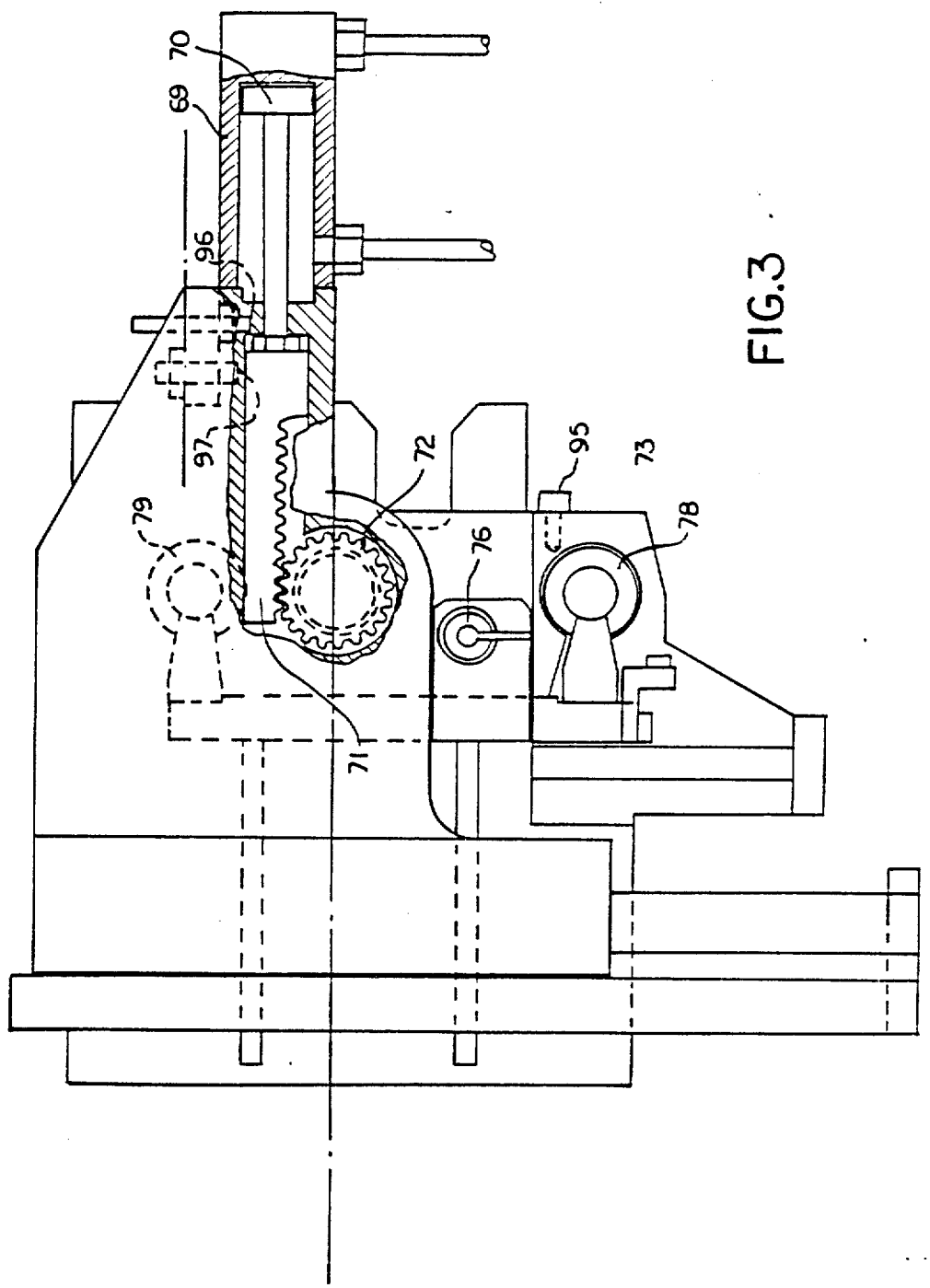
FIG. 3 is a plan view of the tool changer of FIG. 2.

FIGS. 2 and 3, show in greater detail the construction of the tool changer 34.

FIG. 2 shows a portion of the carrier 38 which is movable along the first path 37 established by the beam 39. The tool changer 34 includes a mounting plate 58 which may be fixed to a portion of the carrier 38, such as the right end thereof as viewed in FIG. 1. A block 59 is movable relative to the mounting plate 58 along a second path 60. In the preferred embodiment, this movement is by a hydraulic cylinder 61 and piston 62, and guided by linear ball bearings 63 and 64. A beam 67 is cantilevered from this block 59, to the right as shown in FIG. 2, and so this beam 67 has movement along both first and second paths. The beam 67 carries a hydraulic cylinder 69 with a piston 70 therein, which is connected to a rack 71 meshing with a gear segment 72. This gear segment 72 is connected to a housing 73, so that the housing rotates about a rotational axis 74. Accordingly, the housing 73 moves in three different paths. The housing 73 contains a hydraulic cylinder 75 containing a hydraulic piston 76. This piston is connected to a gusseted plate 77 to move the plate in a vertical direction that is guided by linear ball bearings 78, 79. This gusseted plate 77 thus may move in four different paths. On the lower end of the plate 77 as shown in FIG. 2, the gusseted plate carries a block 82 which, in turn, houses linear ball bearings 83 and 84 for guiding the movement of a plate 85 as actuated by a piston 87 within a cylinder 86 within the block 82. The plate 85 carries two identical tool holder grippers 88 and 89, each of which is adapted to grip any one of the plural tool holders 19. The tool changer 34 is adapted to transport tool holders with tools therein between the tool storage magazine 54 and the machine tool 11, and more specifically to the tool carrying turret 16. The tool grippers 88 and 89 thus have five paths of movement, the first along the first path 37 by movement of the carrier 38. The second is the movement along the second path 60 by the hydraulic cylinder 61. The third is the rotational or 90-degree arcuate path around the rotational axis 74 as effected by the cylinder 69 and rack and gear. The fourth is the upward and downward movement along what has been termed the "third path" parallel to the rotational axis 74. The fifth is the movement in what has been termed the "fourth path" to the right and left as viewed in FIG. 4, as caused by the hydraulic cylinder and piston 86 and 87. It will be noted that the second and fourth paths may be parallel to each other, which might appear to be redundant. As viewed in FIG. 4, the reference line 91 is shown centered on the tool holder gripper 88. The plate 85 is shown at the end of its stroke positioned to the right, and thus the center of the gripper 88 is on the reference line 91 which passes through a point 92 on the tool carrying turret 16, which is where the tool holder keyway 20 is centered. Thus, this is the three o'clock position as viewed in FIG. 5, whereat the tool holder is to be inserted into or removed from the turret 16. At the left end of the stroke of plate 85, the tool gripper 89 will be centered on the reference line 91 so that that gripper may insert into or remove from the keyway 20 at the three o'clock position of the turret. This insertion or removal is effected by the vertical motion along the axis 74 and the tool gripper 88 in the insertion position is shown in the phantom position 88A in FIG. 4.

Figure 4:
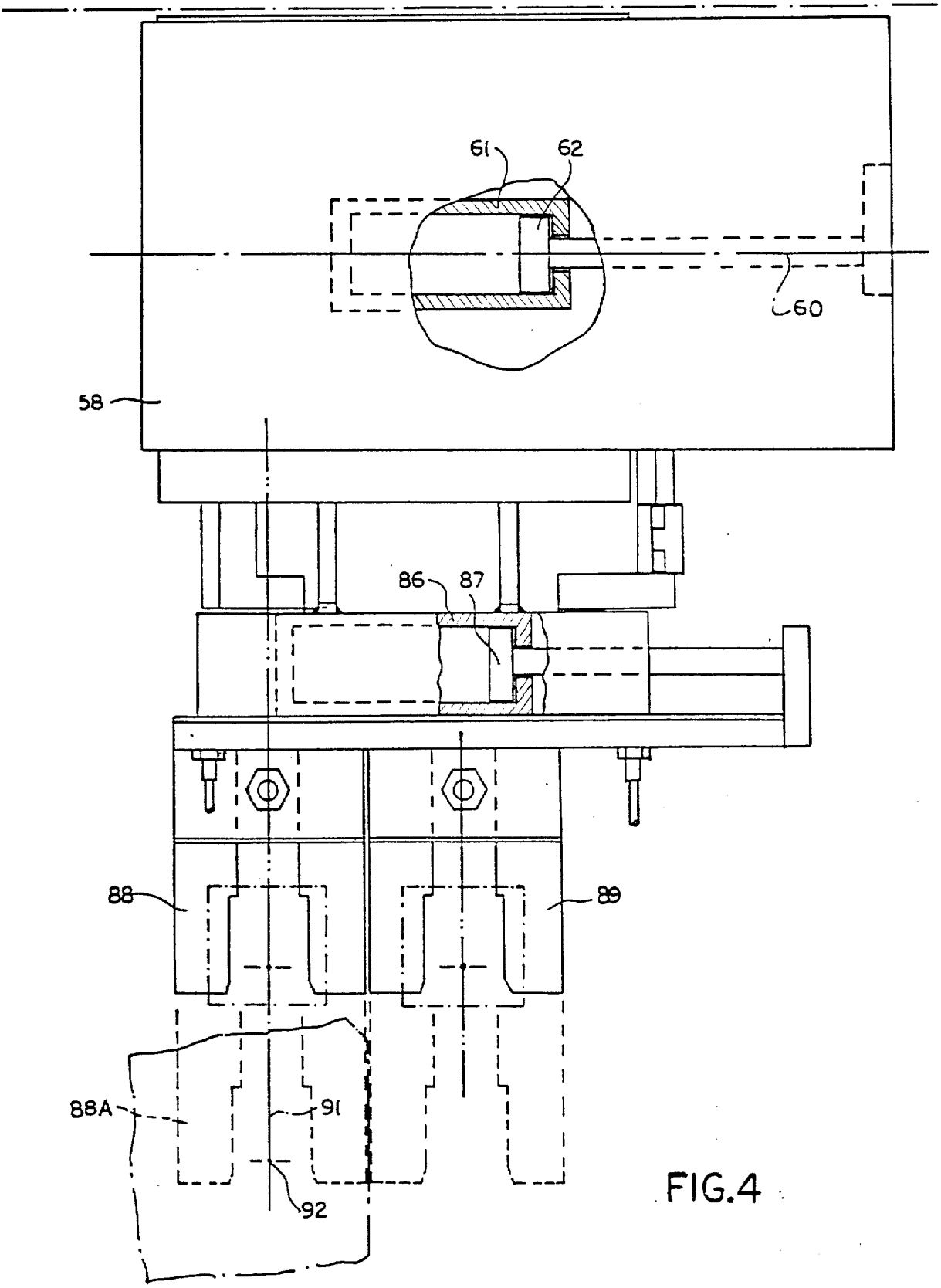
FIG. 4 is an end elevational view of the tool changer.
Figure 5:
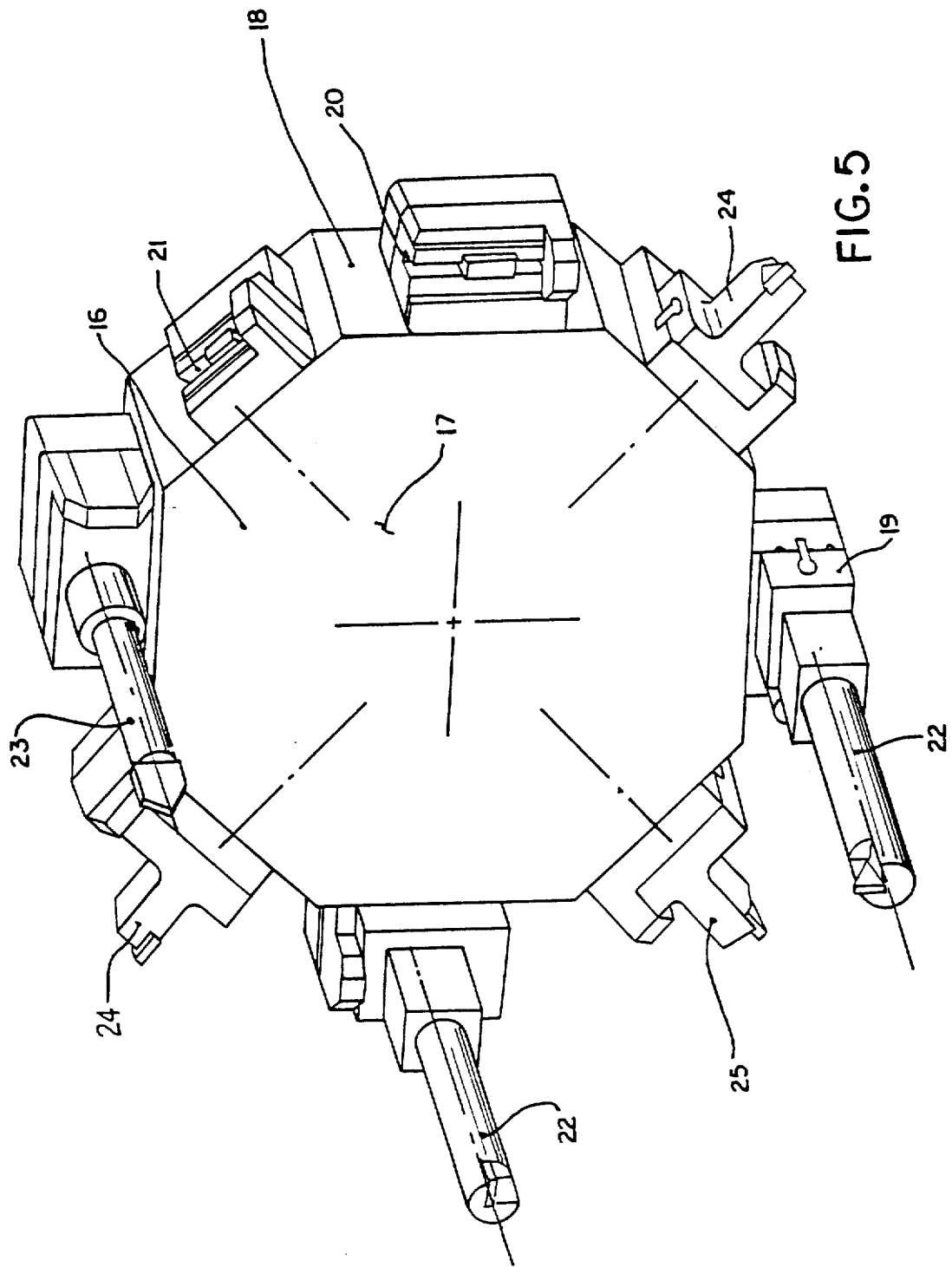
FIG. 5 is an isometric view of the machine tool turret, with the replaceable tool holders thereon.

From FIG. 5, it will be noted that in order to insert a tool holder on the periphery of the turret into the keyways 21, the tool holder grippers 88 and 89 must be rotated 90 degrees, and this is effected by the gear and rack about the rotational axis 74. When so rotated, the grippers are in the position 88B shown in phantom in FIG. 2. This rotation, coupled with the axial movement of the tool changer 34 along axis 37, permits the tool holder grippers 88 and 89 to be in the proper position for insertion into and removal from the keyways 21 on the periphery 18 of the turret. From FIG. 5, it will be noted that the tool holder keyways 21 are to the right of the tool holders 20 when the turret has been indexed for the appropriate keyway to be in the three o'clock position. In FIG. 4 the block 59 is shown in its leftmost position, whereat the reference line 91 is at the center of the keyway 20, In FIG. 4, the block 59 needs only to move to its rightmost position, which aligns the centerline of gripper 88 with centerline 55 of tool magazine 54, and the carrier 88 only needs to move directly parallel to the Z-axis to move the tool changer 34 between the tool storage magazine and the turret 16. In FIG. 1, this turret 16 is shown in an upper position, esignated the tool interchange position, so that the three o'clock position of the turret is at an elevation sufficient to receive the tool holder from the tool changer. It will be noted that when the housing 73 has rotated 90 degrees, motion on the fourth path by the piston 89 is no longer parallel to the second path 60, but becomes parallel to the motion on the first path 37 so that tools may be interchanged.

The tool changer 34 is small and compact compared to the work changer 33, and in addition is much more economical. A reason for this is that in the work changer, at least three of the five axes of motion are servo-controlled with a resolver or some other form of closed-loop or precise position and velocity control system. This means that the workpiece gripper 45 and 46 may be repeatably positioned at any position along the length of travel of these paths. In contradistinction, all of the tool changer 34 motions shown in FIGS. 2, 3, and 4 are sequence-controlled fixed length of travel. By this is meant that the hydraulic piston merely travels from one end of its stroke to the other, and is not precisely positioned along some intermediate portion of the stroke. The only exception to this fixed travel length control on the tool changer is the motion in the first path. This is the motion of the carrier 38 along the beam 39, and this motion is shared in common with the motion of the work changer 33. Thus, this is an ecomony of control motions, with this motion along the first path controlled by the numerical control 35. The tool changer 34, on the other hand, is controlled by the numerical control 50, which controls the operation of the machine tool 11. This numerical control has some excess control channels, such as ON/OFF controls for the coolant and ON/OFF controls for solenoids, etc. These ON/OFF controls are simple sequence controls, and are sufficient for controlling movement on the second, third, fourth, and rotational paths of the tool changer. These sequence-controlled paths are precise positioning in the sense of precise positioning at each of the two ends of movement. This precise positioning, for example, is shown in FIG. 3, whereat a stop 95 will strike an adjustable stop 96 for precise positioning at the end of the 90-degree arcuate movement. Also, there may be a limit switch or proximity switch 97 to inform the numerical control 50 that the housing 73 has swung through this 90-degree arc and is properly positioned.

The closed-loop control as effected by a servo and a resolver feedback, for example, is at least five times as expensive as the fixed length travel sequence control used on four of the five paths of the tool changer 34. This is a great advantage over two separate changers, even if they run on a common rail or beam, because if two separate changers are used, there is always the possibility that they may crash into each other and also an additional closed-loop control system must be used. In this invention, there is a single common closed-loop control along the first path 37 which serves both the work changer 33 and the tool changer 34.

The machine tool 11 has been illustrated as a lathe which some may consider does not have X, Y, and Z axes, but merely the Z-axis of the rotatable spindle and the X axis movement of the slide 15. Nevertheless, the tool changer 34, as well as the work changer 33, have movements in space defined by X, Y, and Z mutually perpendicular axes. The motion on the second path 60 and the third path along the axis 74 are motions in a first plane which is normal to the first path 37. This may be defined as an X-Y plane normal to the Z axis of the rotatable spindle. Also, the rotational axis 74 is in this first plane.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tool and work changer assembly for a machine tool, comprising in combination:
   a member fixed relative to said machine tool;
   a carrier movable on said member in first and second directions in a first path;
   a tool changer mounted on a first portion of said carrier and movable in space defined by X, Y, and Z mutually perpendicular axes;
   said first path of said carrier being parallel to one of said axes and having a length sufficient to move said tool changer between a tool storage magazine and said machine tool;
   a workpiece changer mounted on a second portion of said carrier and movable with said carrier in said first path between a workpiece storage area and said machine tool;
   programmable control means to control movement of said tool changer and to control movement of said workpiece changer with common control of both changers along said first path by movement of said carrier along said member;
   a tool turret on said machine tool to receive tools from said tool changer;
   tool holder sockets on both a front face and the periphery of said tool turret for boring and turning, respectively, and with the sockets oriented 90 degrees to each other; and
   means in said tool changer to rotate a tool gripper therein by 90 degrees about a rotational axis for proper orientation of either the face or periphery mounted tool holders.

2. A tool and work changer assembly as set forth in claim 1, wherein said machine tool is a lathe having rotational movement of a workpiece in a spindle on said Z-axis and having X-axis movement of a tool.

3. A tool and work changer assembly as set forth in claim 1, including a spindle rotatable about said Z-axis and wherein said member is parallel to said Z-axis.

4. A tool and work changer assembly as set forth in claim 1, including means to move said tool changer in two mutually perpendicular paths in a first plane normal to said first path.

5. A tool and work changer assembly as set forth in claim 4, wherein said rotational axis is in said first plane.

6. A tool and work changer assembly for a machine tool, comprising in combination:
   a member fixed relative to said machine tool;

a carrier movable on said member in first and second directions in a first path;

a tool changer mounted on a first portion of said carrier and movable in space defined by X, Y, and Z mutually perpendicular axes;

said first path of said carrier being parallel to one of said axes and having a length sufficient to move said tool changer between a tool storage magazine and said machine tool;

a workpiece changer mounted on a second portion of said carrier and movable with said carrier in said first path between a workpiece storage area and said machine tool;

programmable control means to control movement of said tool changer and to control movement of said workpiece changer with common control of both changers along said first path by movement of said carrier along said member, including in said programmable control means a common closed-loop positioning control of said tool changer and of said workpiece changer along said first path, said tool changer being movable in second and third mutually perpendicular paths in a first plane normal to said first path, and said programmable control of said tool changer being simplified relative to the control of said workpiece changer in requiring only fixed length travel sequence control of movement in said second and third paths.

7. A tool and work changer assembly as set forth in claim 6, including means to rotate said tool changer in a rotational path about a rotational axis.

8. A tool and work changer assembly as set forth in claim 7, wherein said rotational axis is in said first plane and said programmable control of said tool changer is simplified in requiring only movement completely to opposite ends of said rotational path.

9. A tool and work changer assembly as set forth in claim 6, including additional means to move said tool changer in a fourth path parallel to said second path.

10. A tool and work changer assembly as set forth in claim 9, wherein said programmable control of said tool changer is simplified in requiring only movement completely to opposite ends of said fourth path.

* * * * *

UNITED STATES PATENT AND TRADEMARK OFFICE
CERTIFICATE OF CORRECTION

PATENT NO. : 4,736,512    Page 1 of 4

DATED : April 12, 1988

INVENTOR(S) : Gusching et al.

It is certified that error appears in the above-identified patent and that said Letters Patent is hereby corrected as shown below:

Col. 1, line 67, "ont he" should read as --on the--.

Col. 5, line 7, "esignated" should read as --designated--.

Col. 5, line 12, "89" should read as --87--.

Add FIGS. 3, 4, and 5 to the drawings as shown on the attached sheets.

Signed and Sealed this

Twenty-ninth Day of November, 1988

Attest:

DONALD J. QUIGG

Attesting Officer    Commissioner of Patents and Trademarks